Freeman D'Ossone, Primary School Slate
No. 119,332.   Patented Sep. 26, 1871.
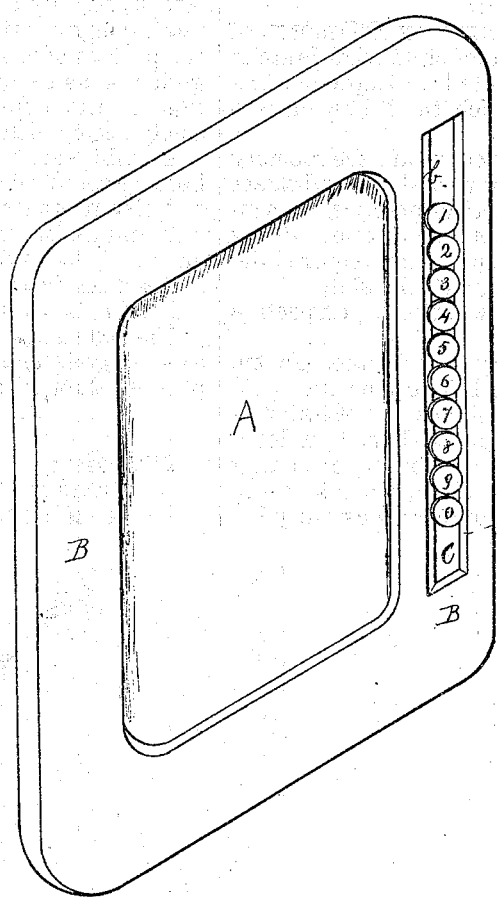

119,332

UNITED STATES PATENT OFFICE.

FREEMAN D'OSSONE, OF PHILADELPHIA, PENNSYLVANIA.

IMPROVEMENT IN SLATES.

Specification forming part of Letters Patent No. 119,332, dated September 26, 1871.

*To all whom it may concern:*

Be it known that I, FREEMAN D'OSSONE, of the city and county of Philadelphia and State of Pennsylvania, have invented an Improved Primary-School Slate, of which the following is a description:

My invention is designed to aid the memory of children while learning to add and substract and perform other arithmetical practice. It consists simply of a number of numerals or sliding pieces which are numbered to any required degree, and move in the frame of the slate.

The accompanying drawing is a perspective view of my invention.

A represents an ordinary school-slate. In one or both sides of its frame B is formed an opening, C, which has in this instance two of its longitudinal edges, a, formed into V-shaped guides b, over which slide the numerical blocks or sliding pieces 1 2 3 4 5 6 7 8 9. A child, when learning to add or count, has the numbers constantly before it, and by merely sliding them together it readily learns, without forcing the imagination, the process of uniting two or more numbers together so as to form a single number. Subtraction, or the difference between numbers, is as easily accomplished.

A child learning to add or subtract is apt to become confused and drop some of the numbers, and also to guess at the answer. My invention aids and assists the mental powers of children, and vastly helps the learner to acquire confidence and self-reliance.

I claim as my invention—

The slate A, in combination with the numerals or sliding-pieces 1 2 3 4, &c., substantially for the purpose shown and described.

FREEMAN D'OSSONE.

Witnesses:
  FRANCIS D. PASTORIUS,
  JOHN YILLE.